Feb. 21, 1967   D. E. WARD   3,304,999
REGENERATOR PACKING
Filed Dec. 2, 1964

INVENTOR
DEREK EDWIN WARD
BY
Shoemaker and Mattare
ATTORNEYS

3,304,999
REGENERATOR PACKING
Derek E. Ward, Enfield, Middlesex, England, assignor to The British Oxygen Company Limited, London, England
Filed Dec. 2, 1964, Ser. No. 415,259
Claims priority, application Great Britain, Dec. 5, 1963, 48,040/63
9 Claims.  (Cl. 165—10)

This invention relates to packings for use in regenerators and more particularly for use at very low temperatures down to 4° K. or even lower.

Regenerators, or cold accumulators as they are sometimes known, are widely used in the large scale liquefaction of gases as a form of heat exchanger, in which the refrigeration contained in the waste gas is accumulated by a packing during one part of a cycle and is used to cool the gas to be liquefied during the other phase of the cycle. The packing material used to fill the regenerator must have a large heat capacity and a large surface area and should not offer too great a resistance to the flow of gas through the regenerator. In regenerators designed for use at relatively high subatmospheric temperatures, such as, for example, those met with in air liquefaction, there is little difficulty in finding materials which meet these requirements. Suitable packings which have been extensively used for this purpose are "pancakes" of spirally wound corrugated aluminium ribbon stacked one above the other, and small regularly shaped pebbles of siliceous rock.

While such materials are satisfactory for use at temperatures down to 60° K., they are quite inadequate for use in regenerators which must operate at lower temperatures such as are required in hydrogen and helium liquefiers. In the case of helium, for example, the cold end of the regenerator may operate at a temperature of 4° K. or even lower, and in the case of hydrogen temperatures in the region of 20° K. may be required. At such low temperatures, there is considerable difficulty in finding suitable materials for the regenerator packing, as nearly all existing materials have very low specific heats at these low temperatures. This is illustrated in Table I below which shows the specific heat of aluminium and lead at such very low temperatures.

TABLE I

| Temperature, ° K. | Specific heat, cals./cc./° K. | |
|---|---|---|
|  | Aluminium | Lead |
| 100 | 0.296 | 0.327 |
| 20 | 0.00594 | 0.14 |
| 10 | 0.00081 | 0.0372 |
| 6 | 0.00032 | 0.0079 |
| 4 | 0.00016 | 0.0019 |

Aluminium is a material which is much used in the construction of regenerator packings designed to be used at relatively high subatmospheric temperatures since it has a specific heat of 0.251 cals/g./° K. at 288° K. or 0.58 cals/cc./° K. at this temperature. However, as Table I shows, the specific heat of aluminium falls to a value of 0.00594 cals/cc./° K. at 20° K. and to a value of only 0.00016 cals/cc./° K. at 4° K. It is therefore quite impracticable to use aluminium for the construction of regenerator packings designed to work at temperatures down to 4° K. Better results may be achieved using lead as the packing material since it has a specific heat of 0.14 at 20° K., but the specific heat falls to the low value of 0.0019 at 4° K. In addition, the high specific gravity of metallic lead would necessitate the use of a great weight of packing material in order to fully occupy the volume required.

It is an object of the present invention to provide a regenerator packing which is suitable for use at temperatures below 30° K. and may be used at temperatures down to 2° K. and even lower if required.

According to the invention, a regenerator packing for use at very low temperatures of below 30° K. consists of a plurality of hollow containers filled with helium or neon under pressure.

The advantages of helium and neon over aluminium, which is a typical conventional packing for use at relatively high subatmospheric temperatures, and over lead, which is the best packing previously available for use below 30° K., are illustrated in Table II below, in which the specific heats of the three materials are compared for various temperatures, the helium being at a pressure of 70 atm. at 4° K. and at progressively higher pressures at higher temperatures to maintain the original density of the mass of gas at 4° K. and 70 atm.

TABLE II

| Temperature, ° K. | Specific heat, cals./cc./° K. | | | |
|---|---|---|---|---|
|  | Aluminium | Lead | Helium | Neon |
| 100 | 0.296 | 0.327 | 0.0665 |  |
| 20 | 0.00594 | 0.14 | 0.148 |  |
| 10 | 0.00081 | 0.0372 | 0.124 | .131 at 11° K. (solid). |
| 6 | 0.00032 | 0.0079 | 0.099 |  |
| 4 | 0.00016 | 0.0019 | 0.074 |  |

As will be seen from the above table the specific heat of the helium is considerably greater than that of aluminium at 20° K. and considerably greater than the specific heats of both aluminium and lead at lower temperatures down to 4° K.

The containers for the gas may be of any shape which is convenient for packing the regenerator. A preferred form of container consists of a length of tubing sealed at both ends and containing the helium or neon under pressure, the tubing being thick walled small bore tubing preferably with external fins or protuberances, the tube wall thickness of which is such that the walls are capable of withstanding the necessary high pressure (e.g. a pressure of about 15,000 p.s.i. at room temperature corresponding to a pressure at 4° K. in the region of 70 atm.) and also of providing a reasonable surface area for heat transfer, but not being so great as to appreciably reduce the rate of heat transfer. After being filled with gas and sealed, the tube is wound spirally into a flat "pancake" and a series of these pancakes are stacked one above the other in the regenerator. The fins or protuberances serve to separate the tubes of each layer and permit the flow of gas between the tubes, thereby promoting heat transfer.

The container may be made of any suitable metal which can be formed into the desired shape and will contain the compressed gas without loss by permeation or leakage.

It is not necessary that the packing of the invention should be used for filling the whole of a regenerator. Conventional packing may be used for filling part of the regenerator and packing according to the present invention for the remainder. Such a system is useful in a regenerator having a considerable temperature difference between its two ends. In such a case, the zone of the regenerator which in use is subjected only to relatively high temperatures might consist of a conventional packing such as, for example, pancakes prepared from corrugated aluminium strip, whilst the zone of the regenerator which in use is subjected to temperatures of below 30° K. consists of packing according to the present invention.

Various embodiments of the invention will now be described with reference to the accompanying drawings, in which.

Figure 1:
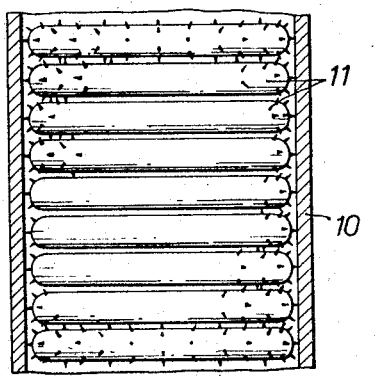
FIGURE 1 is a diagrammatic side view of part of a regenerator packed with one form of packing according to the invention, part of the side wall of the regenerator being cut away to show the packing.
Figure 3:
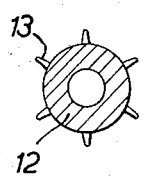
FIGURE 3 is a cross-sectional view of the tube used to form the hollow body of FIGURE 2 on an enlarged scale.
Figure 2:
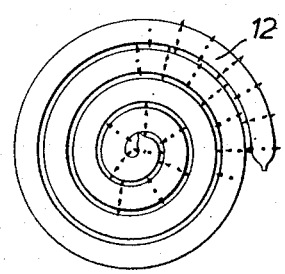
FIGURE 2 is a diagrammatic plan view of one of the hollow bodies forming the packing of FIGURE 1.

Referring to FIGURE 1, a regenerator 10 is packed with a plurality of flat layers or pancakes 11, each of which consists, as shown in FIGURE 2, of a hollow capillary tube 12 filled with helium or neon under pressure and closed at each end, the tube 12 being wound to form a spiral of a diameter just sufficient to fit with the regenerator 10. As shown in FIGURE 3, the tubing has fins or protuberances 13 which serve as distance pieces to separate the tubes and control the gas flow characteristics of the packing.

Figure 4:
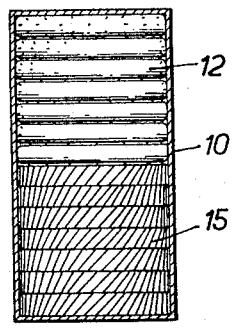
FIGURE 4 is a diagrammatic side view of a regenerator partially packed with the packing of FIGURES 1 to 3, and partially with conventional packing.
Figure 5:
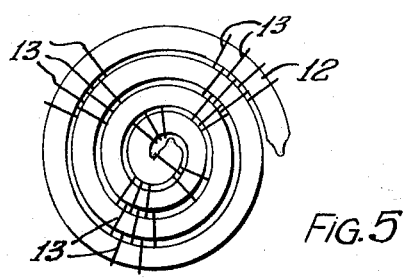
FIGURE 5 is a diagrammatic plan view of one of the hollow bodies showing fins on the tubing.

As previously stated, it may in some cases be convenient to pack only a part of the regenerator with packing according to the invention, the remainder being packed with a conventional packing. This is illustrated in FIGURE 4, in which the regenerator 10 is packed at the upper end with the packing shown in FIGURES 1 to 3 and at the lower end with conventional packing in the form of pancakes 15 made from coiled corrugated aluminium strip.

What I claim as my invention and desire to secure by Letters Patent of the United States is:

1. In a regenerator a packing for use therein at very low temperatures of below 30° K. consisting of a plurality of hollow containers filled with a rare gas selected from the group consisting of helium and neon under pressure.

2. A regenerator packing according to claim 1 wherein each of said containers consists of a length of small bore tubing closed at each end and wound to form a flat spiral, said flat spirals being stacked one upon another to form the packing.

3. A regenerator packing according to claim 2 wherein said tubing has external fins or protuberances.

4. A regenerator packing according to claim 2 wherein the containers are made of metal.

5. A regenerator packing according to claim 2 wherein the hollow containers are capable of withstanding a pressure of at least 15,000 pounds per square inch.

6. A regenerator comprising an outer shell packed with a plurality of hollow containers filled with a rare gas selected from the group consisting of helium and neon under pressure.

7. A regenerator comprising an outer shell packed with a plurality of hollow containers, each consisting of a length of small bore tubing closed at each end and wound to form a flat spiral, filled with a rare gas selected from the group consisting of helium and neon under pressure, said spirals being stacked one upon another substantially to fill the space defined within said outer shell.

8. A regenerator comprising an outer shell, having a part of the space defined within said outer shell packed with conventional packing and the remainder of said space packed with a plurality of hollow containers filled with a rare gas selected from the group consisting of helium and neon under pressure.

9. A regenerator comprising an outer shell, having a part of the space defined within said outer shell packed with conventional packing and the remainder of said space packed with a plurality of hollow containers, each consisting of a length of small bore tubing closed at each end and wound to form a flat spiral, filled with a rare gas selected from the group consisting of helium and neon under pressure, said spirals being stacked one upon another substantially to fill the space defined within said outer shell.

References Cited by the Examiner

UNITED STATES PATENTS

| | | | |
|---|---|---|---|
| 2,231,236 | 2/1941 | Wentworth | 219—462 X |
| 2,492,788 | 12/1949 | Dennis | 165—10 X |
| 2,813,698 | 11/1957 | Lincoln | 165—105 X |
| 3,004,394 | 10/1961 | Fulton et al. | 165—186 X |
| 3,060,870 | 10/1962 | Hexdall | 165—104 X |
| 3,200,877 | 8/1965 | Lehmer et al. | 165—4 |

ROBERT A. O'LEARY, *Primary Examiner.*

ALBERT W. DAVIS, JR., *Assistant Examiner.*